United States Patent
Ishii et al.

(10) Patent No.: US 10,261,495 B2
(45) Date of Patent: Apr. 16, 2019

(54) CONTROLLING OPERATION OF A MACHINING TOOL

(71) Applicant: MAKINO MILLING MACHINE CO., LTD., Tokyo (JP)

(72) Inventors: Kazunari Ishii, Aiko-gun (JP); Takehito Shinada, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 15/522,230

(22) PCT Filed: Oct. 29, 2014

(86) PCT No.: PCT/JP2014/078745
§ 371 (c)(1),
(2) Date: Apr. 26, 2017

(87) PCT Pub. No.: WO2016/067384
PCT Pub. Date: May 6, 2016

(65) Prior Publication Data
US 2017/0315535 A1    Nov. 2, 2017

(51) Int. Cl.
G05B 19/402    (2006.01)
G05B 19/4065   (2006.01)

(52) U.S. Cl.
CPC ....... G05B 19/402 (2013.01); G05B 19/4065 (2013.01); *G05B 2219/37077* (2013.01);
(Continued)

(58) Field of Classification Search
CPC .............. G05B 19/402; G05B 19/4065; G05B 2219/50206; G05B 2219/37077; G05B 2219/45044
See application file for complete search history.

(56) References Cited

U.S. PATENT DOCUMENTS 5,568,028 A * 10/1996 Uchiyama .......... G05B 19/4065
                                                318/433
5,822,212 A * 10/1998 Tanaka ............... G05B 19/4063
                                                700/174
(Continued)

FOREIGN PATENT DOCUMENTS

CN    101412196    4/2009
CN    202726639    2/2013
(Continued)

OTHER PUBLICATIONS

International search report dated Jan. 27, 2015, directed to PCT Application No. PCT/JP2014/078745; 1 page.
(Continued)

*Primary Examiner* — Nathan L Laughlin
(74) *Attorney, Agent, or Firm* — Morrison & Foerster LLP

(57) ABSTRACT

Provided is a control method for a machining tool that processes a workpiece while causing a tool, which rotates by means of a main shaft motor, and the workpiece, which is secured to a table, to move relative to one another, wherein on the basis of the torque command value, the current command value, or the actual current value of the main shaft motor, calculated is the actual cutting force of the tool that is received from the workpiece at a location which is predetermined during the processing of the workpiece, and the actual cutting force that has been calculated is displayed on a display unit.

4 Claims, 9 Drawing Sheets

(52) U.S. Cl.
CPC .............. *G05B 2219/45044* (2013.01); *G05B 2219/50206* (2013.01)

(56) References Cited

U.S. PATENT DOCUMENTS

| | | | |
|---|---|---|---|
| 2003/0170085 A1* | 9/2003 | Kakino | G05B 19/40937 409/132 |
| 2007/0016325 A1* | 1/2007 | Esterling | B23Q 17/0961 700/175 |
| 2012/0173012 A1* | 7/2012 | Matsunaga | B23Q 1/70 700/177 |
| 2014/0123740 A1 | 5/2014 | Yoshikawa et al. | |

FOREIGN PATENT DOCUMENTS

| | | |
|---|---|---|
| CN | 103433807 | 12/2013 |
| JP | 6-335841 | 12/1994 |
| JP | 7-51997 | 2/1995 |
| JP | 8-19939 | 1/1996 |
| JP | 11-58113 | 3/1999 |
| JP | 2005-205517 A | 8/2005 |

OTHER PUBLICATIONS

Apichatbanlue, U et al. "Data Acquisition System for Main Cutting Force Measurement in Turning Operation," 2011 11th International Conference on Control, Automation and Systems, Oct. 26-29, 2011, Gyeonggi-do, Korea; pp. 1003-1005.

Extended Search Report dated Jul. 16, 2018, directed to EP Application No. 14904703; 4 pages.

* cited by examiner

CONTROLLING OPERATION OF A MACHINING TOOL

CROSS-REFERENCE TO RELATED APPLICATION

This application is a U.S. national stage patent application of PCT/JP2014/078745, filed Oct. 29, 2014, the entire contents of which is incorporated herein by reference.

FIELD OF THE INVENTION

The present invention relates to a control method for a machine tool and a control apparatus for a machine tool.

BACKGROUND OF INVENTION

In the conventional art, there is known a machine tool in which machining such as cutting is performed by moving a tool relative to a workpiece. A numerical control type machine tool is also known in which, in such a machine tool, a tool path is specified by the coordinate or the like of a predetermined feed axis, and machining is performed while the tool is being moved with respect to the workpiece. The machine tool can perform machining automatically while changing the relative position of the tool with respect to the workpiece by movement of at least one of the workpiece and the tool in accordance with a command from a control apparatus.

During a period in which the workpiece is machined by the machine tool, the tool moves relative to the workpiece in order to remove a part of the workpiece. A tool such as an end mill performs machining while rotating about its axis. During the machining of the workpiece, a force is applied to the tool. For example, the tool is applied with a force in a direction opposite to the direction that the tool travels with respect to the workpiece. Furthermore, the rotating tool is applied with a force in a direction opposite to the direction in which the tool rotates. When an excessive force is applied to the tool during machining of the workpiece, there is a possibility that the tool may be damaged or the spindle device may break down. For example, the tool may be broken, or an edge of the tool may be chipped.

In Japanese Unexamined Patent Publication No. 2005-205517A, there is disclosed a cutting control method for a machine tool in which it is monitored whether or not the spindle load during cutting of a workpiece falls within a target load range. In this cutting control method, it is disclosed that when the spindle load exceeds the target load range, each override value with respect to each speed setting value of the spindle rotation speed and the cutting feed speed is decreased so as to control the rotational speed of the spindle and the cutting feed speed.

CITATIONS LIST

Patent Literature

Patent Literature 1: Japanese Unexamined Patent Publication No. 2005-205517A

BRIEF SUMMARY OF THE INVENTION

By monitoring the rotational torque of the spindle during a period in which a workpiece is machined, it is possible to reduce the possibility of damage of the tool and the spindle device. In the cutting control apparatus disclosed in Japanese Unexamined Patent Publication No. 2005-205517 described above, rotational torque is calculated using current value of a spindle motor, and it is monitored whether or not the rotational torque exceeds a target range. In other words, the rotational torque output from the spindle motor is determined as a force applied to the tool. However, the tool has various tool diameters. Even though the rotational torque output by the spindle motor is a predetermined value, the cutting force received by the tool from the workpiece varies depending on the tool diameter. For example, even though the rotational torque is constant, the force received by the tool at the contact portion between the tool and the workpiece decreases as the tool diameter increases.

In the tool, an allowable cutting force thereof exists as a force that can be applied to the part of the tool that machines the workpiece. However, it is difficult for the operator to associate the rotational torque output from the spindle motor with the allowable cutting force. The conventional art uses a method in which the operator calculates an actual cutting force by manual calculation using a rotational torque, and confirms soundness of the tool.

As a method of checking the soundness of the tool, there is a method of confirming whether or not a tool or the like is damaged by performing the same test machining as the desired machining beforehand. When the tool or the like is not damaged, the rotational torque when the test machining was performed may be adopted as the allowable torque. During the period of actual machining, monitoring can be performed such that the rotational torque does not exceed the allowable torque. However, with this method, it is necessary to perform the same machining as the desired machining beforehand, resulting in a problem of low productivity.

The present invention has an object to provide a control method for a machine tool and a control apparatus for a machine tool, in which the soundness of a tool or a spindle device is easily and accurately monitored.

The control method for the machine tool according to the present invention is a control method for a machine tool for machining a workpiece while relatively moving a tool rotated by a spindle motor and the workpiece fixed to a table. In the control method, an actual cutting force received from the workpiece at a predetermined position of the tool during machining of the workpiece is calculated based on a torque command value, a current command value, or an actual current value of the spindle motor, and the calculated actual cutting force is displayed on a display part.

In the invention described above, a determination value is preset based on an allowable cutting force which is allowed to be applied at the predetermined position of the tool, and when the actual cutting force exceeds the determination value, the relative speed of the tool with respect to the workpiece can be reduced.

In the invention described above, the allowable cutting force as a function of a length of the tool protruding from the spindle and a tool diameter can be predetermined for a plurality of the tools, and the allowable cutting force for the tool, which may damage the tool, can be calculated based on the protrusion length and the tool diameter of the tool used for the machining.

In the invention described above, the allowable cutting force for the tool, which relates to damage of the tool, the allowable cutting force for a bearing, which may damage the bearing in the spindle device, and the allowable cutting force for the spindle motor, which may damage the spindle motor, can be calculated, and the determination value can be set based on the smallest allowable cutting force among the allowable cutting force for the tool, the allowable cutting force for the bearing, and the allowable cutting force for the spindle motor.

The control apparatus for the machine tool according to the present invention is a control apparatus for a machine tool for machining a workpiece while relatively moving a tool rotated by a spindle motor and the workpiece fixed to a table. The control apparatus includes a cutting force calculation part that calculates an actual cutting force received from the workpiece at a predetermined position of the tool during machining of the workpiece based on a torque command value, a current command value, or an actual current value of the spindle motor.

According to the present invention, it is possible to provide a control method for a machine tool and a control apparatus for a machine tool, which simply and accurately monitors soundness of a tool and a spindle device.

DETAILED DESCRIPTION OF THE INVENTION

Referring to FIGS. 1 to 10, description will be made of a control method for a machine tool and a control apparatus for the machine tool in an embodiment. The machine tool of the present embodiment is a numerical control type in which machining is performed by automatically moving a tool relative to a workpiece in accordance with a machining program.

Figure 1:
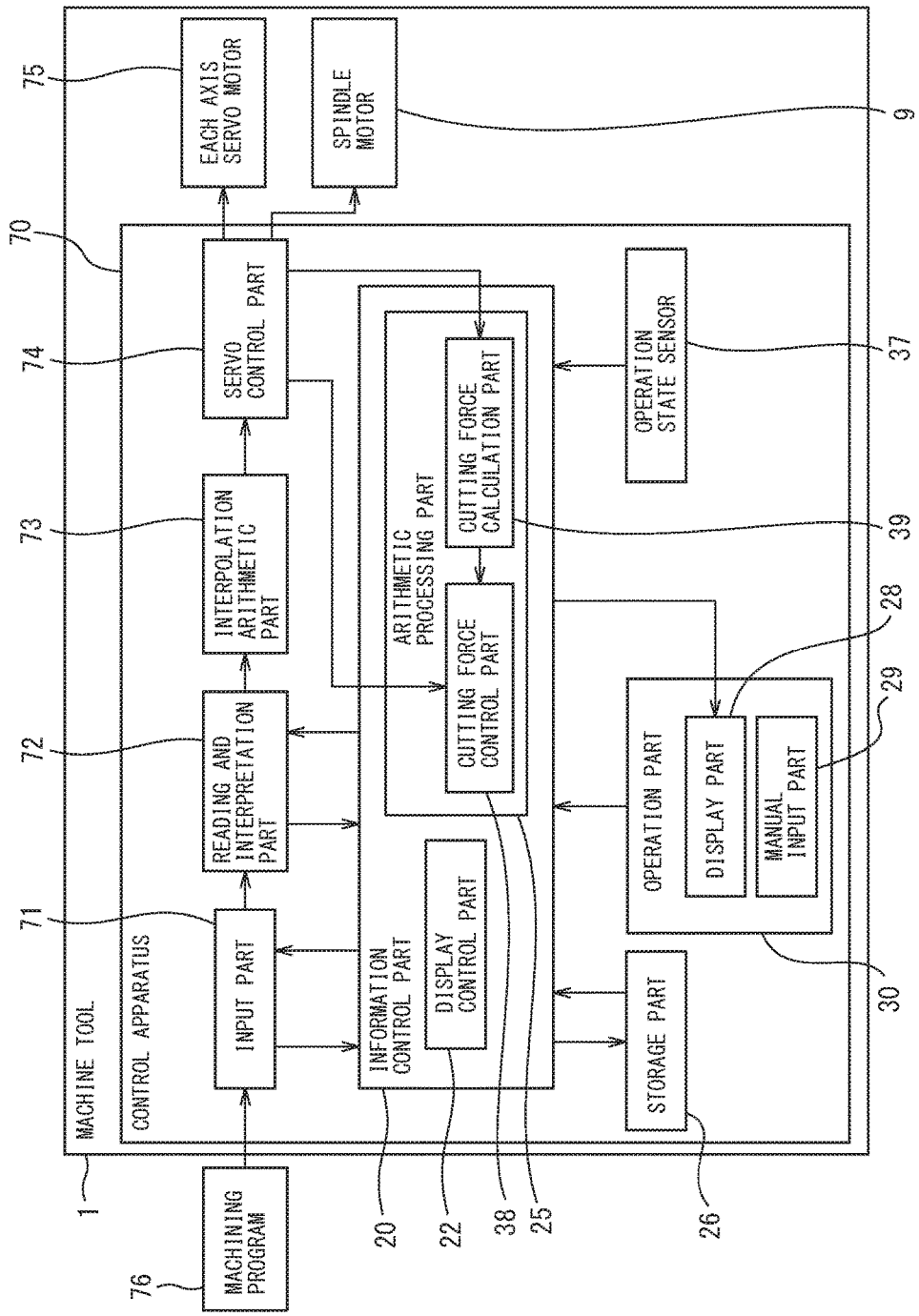
FIG. 1 is a block diagram of a machine tool.

FIG. 1 illustrates a block diagram of the machine tool in the present embodiment. The machine tool 1 includes a control apparatus 70 that performs control of a movement device for each feed axis. The control apparatus 70 includes a CPU (Central Processing Unit), RAM (Random Access Memory), and ROM (Read Only Memory), which are connected to each other, for example, via a bus.

The control apparatus 70 includes an input part 71, a reading and interpretation part 72, an interpolation arithmetic part 73, and a servo control part 74. When machining is performed by a numerically controlled machine tool, a machining program 76 is prepared beforehand. The machining program 76 may be prepared by a CAM (Computer Aided Manufacturing) apparatus or the like based on a target shape of a workpiece. The target shape of the workpiece may be created, for example, with a CAD (Computer Aided Design) apparatus.

The machining program 76 is inputted to the input part 71. In the machining program 76, information of relative movement of the tool with respect to the workpiece, information of a rotational speed of a spindle, and information of the tool are included. The machining program which is newly created or edited in an information control part 20 of the control apparatus 70 by an operator may be inputted to the input part 71.

The reading and interpretation part 72 reads the machining program 76 from the input part 71. The reading and interpretation part 72 sends out a movement command to the interpolation arithmetic part 73. The interpolation arithmetic part 73 calculates a position command value of each feed axis for each interpolation cycle. For example, the interpolation arithmetic part 73 calculates a movement amount of each feed axis for each time interval set based on the movement command. The interpolation arithmetic part 73 sends out the position command value of each feed axis to the servo control part 74. The servo control part 74 drives each axis servo motor 75 for each feed axis, such as X-axis, Y-axis, and Z-axis, based on the position command value. The servo control part 74 drives a spindle motor 9 that rotates a tool 6. The servo control part 74 acquires a rotational speed of the spindle motor 9 specified by the machining program 76 from the reading and interpretation part 72 through the interpolation arithmetic part 73. The servo control part 74 calculates a torque command of the spindle motor 9 and converts it to a current command value, which in turn is sent to the spindle motor 9.

The control apparatus 70 of the present embodiment includes an information control part 20 that controls machining information related machining of the workpiece, an operation part 30 to which the operator inputs an input value of the machining information or the like, and a display part 28 that displays the machining information. It is possible to exemplify, as the machining information, information related to the program, information related to the tool, information related to the coordinate, and information related to the machine tool and the workpiece during a machining operation. The information control part 20 acquires the machining program 76 for performing the current machining operation from the input part 71. The information control part 20 includes an arithmetic processing part 25 that performs operation and processing of the machining information. For example, the arithmetic processing part 25 can create a machining program for the current machining operation by editing the machining program 76 inputted from the input part 71 and send it to the input part 71. Further, the arithmetic processing part 25 can perform a predetermined judgment or a predetermined calculation based on the machining information inputted by the operator.

The operation part 30 includes a manual input part 29 that has a keyboard or the like and inputs the machining information by manual operation of the operator. The operation part 30 of the present embodiment includes a display part 28. In the present embodiment, the display part 28 adopts a touch panel type in which a desired part can be selected by touching a screen. The machining information can be inputted by the operator manipulating the screen of the display part 28. The operation part 30 is not limited thereto but may use any device that enables the operator to input the machining information.

The control apparatus 70 includes a storage part 26 that stores the machining information. The storage part 26 may be not only the above-mentioned ROM and RAM but also a storage device such as memory card or hard disk connected via a communication interface.

The information control part 20 includes a display control part 22 that controls an image displayed on the display part 28. The display control part 22 acquires machining information from the arithmetic processing part 25 or provides machining information to the arithmetic processing part 25. Further, the display control part 22 has functions for creating an image based on the machining information and displaying the image on the display part 28.

The control apparatus 70 includes an operation state sensor 37 that detects an operation state of the machine tool 1. The information control part 20 can acquire a signal of the operation state sensor 37. It is possible to exemplify, as the operation state sensor 37, a sensor that detects a movement amount of each feed axis, a rotational speed sensor attached to each axis servo motor 75 or the spindle motor 9 for detecting a rotational speed, a current sensor that detects a current value actually flowing to the spindle motor 9, and the like. Outputs of the sensor that detects the movement amount of the feed axis and the rotational speed sensor are fed back to the servo control part 74. The output of the rotational speed sensor that detects the rotational speed of the spindle motor 9 is also sent to the information control part 20. An output of the current sensor is sent to the information control part 20.

Figure 2:
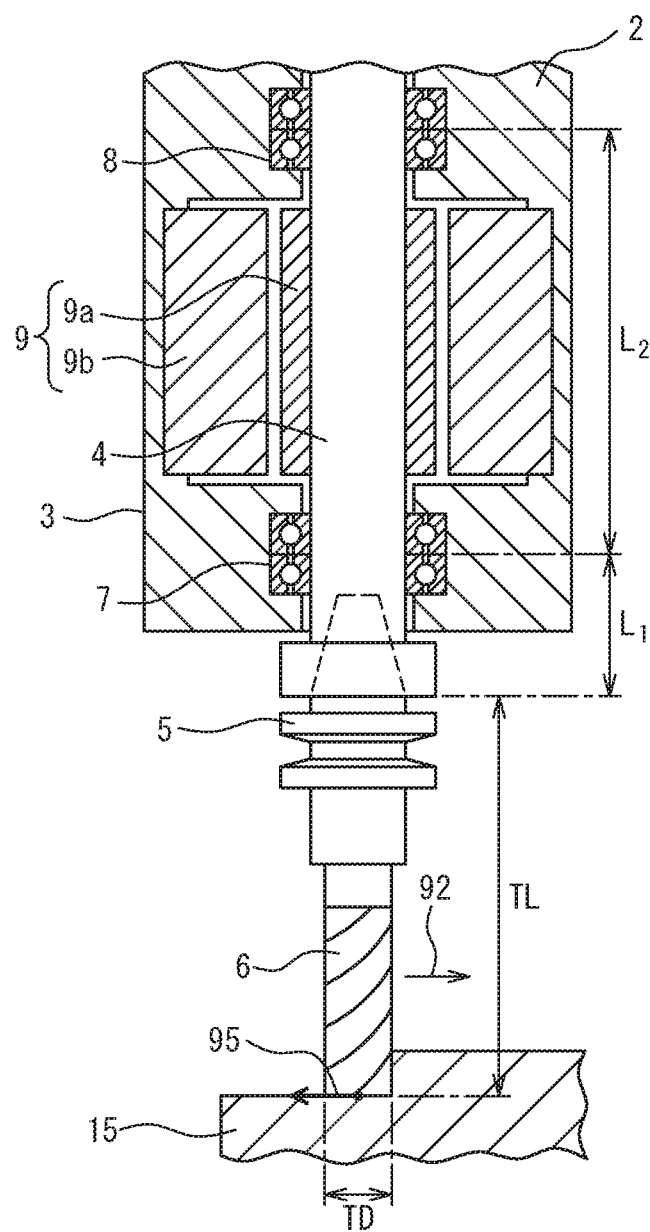
FIG. 2 is an enlarged schematic sectional view of a portion including a spindle head of the machine tool and a workpiece.

FIG. 2 shows a schematic sectional view of a spindle device in the present embodiment. The workpiece 15 is fixed to a table of the machine tool 1. The spindle device 2 includes a spindle 4 that supports the tool 6, and a housing 3 in which the spindle 4 is located. The tool 6 is supported by the spindle 4 through a tool holder 5.

The spindle device 2 includes the spindle motor 9 that rotates the tool 6. The spindle device 9 of the present embodiment is a built-in type rotator disposed in the housing 3. A stator 9b is disposed on an inner surface of the housing 3. A rotor 9a is disposed on an outer surface of the spindle 4. The spindle motor 9 is composed of the stator 9b and the rotor 9a. The spindle 4 is formed in a cylindrical shape. A device for exchanging the tool 6 is contained in the spindle 4. The spindle motor 9 of the present embodiment is the built-in type, but not limited thereto, and the spindle motor may use any mechanism that can rotate the spindle 4. For example, the spindle motor may be disposed outside the housing.

In the present embodiment, along the directions in which the axis of rotation of the spindle 4 extends, the side where the tool 6 is secured is referred to as a front side, and the side opposite to the side where the tool 6 is secured is referred to as a rear side. The end of the front side of the spindle 4 is supported by a front bearing 7 serving as a bearing for one side. The end of the rear side of the spindle 4 is supported by a rear bearing 8 serving as a bearing for the other side. The front bearing 7 and the rear bearing 8, which serve as the bearings, are supported by the housing 3. The spindle 4 is rotatably supported by the front bearing 7 and the rear bearing 8.

Figure 3:
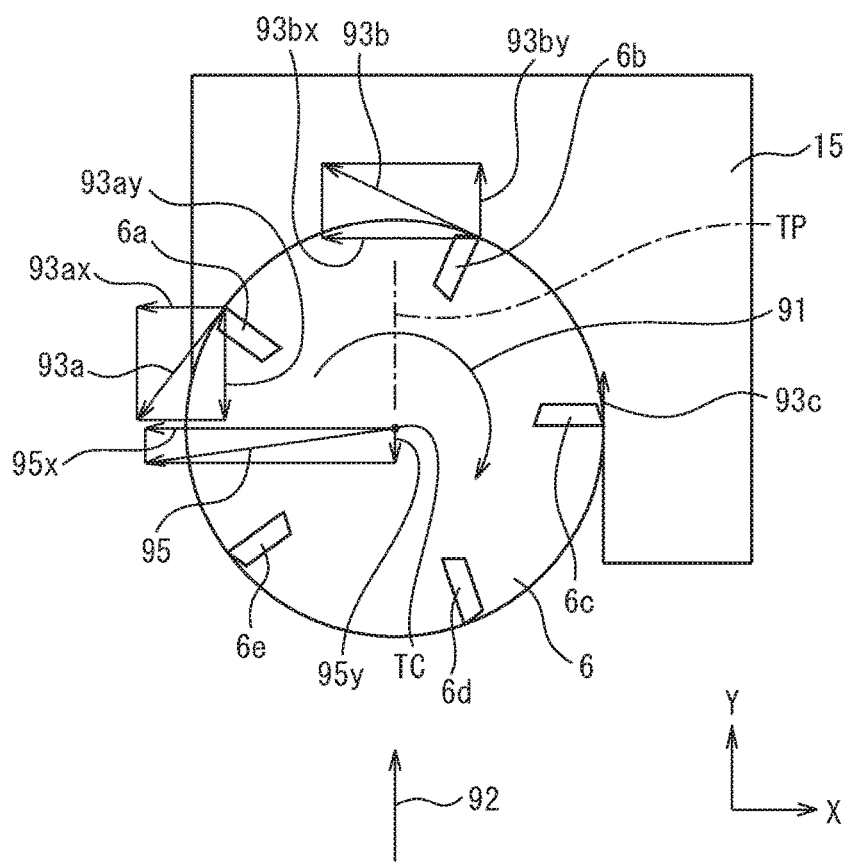
FIG. 3 is a schematic view of a tool and a workpiece for explaining a cutting force.

FIG. 3 shows an enlarged schematic view of a workpiece and a distal end portion of the tool when the workpiece is being machined. The present embodiment will be described by exemplifying a five-blade flat end mill as the tool 6. The tool 6 is not limited to the flat end mill, but may use any tool. For example, a tool may be used which machines the workpiece while being rotated by the spindle motor 9.

Referring to FIG. 1, the control apparatus 70 calculates an actual cutting force during machining based on a variable relating to a load of the spindle motor 9 and a rotational speed of the spindle 4. The control apparatus 70 also calculates an allowable cutting force based on machine parameters stored beforehand in a storage part 26, and sets a determination value of the cutting force based on the calculated allowable cutting force. Then, the control apparatus 70 determines the soundness of the tool 6 and the spindle device 2 by comparing the actual cutting force with the determination value.

Referring to FIGS. 2 and 3, description will be made of the actual cutting force applied to the tool 6. In the example illustrated in FIG. 3, a portion of the surface of the workpiece 15 is cut by the tool 6. The tool 6 is rotated by the spindle motor 9 in a direction indicated by an arrow 91. In addition, the tool 6 is relatively moved with respect to the workpiece 15 as indicated by an arrow 92. In this example, the tool 6 is moved in a horizontal direction while the workpiece 15 is stopped.

A cutting force is a force applied to the tool 6 during cutting. The cutting force is a force generated in an area of contact between the tool 6 and the workpiece 15, which is also referred to as a cutting resistance. Generally, cutting forces in milling includes a force acting in a tangential direction opposite to the rotation direction of the outer periphery of the tool 6, a feed component force acting in a direction opposite to the feeding direction of the tool 6, and a thrust component force acting in a direction opposite to the cutting in the axial direction of the tool 6. Among these component forces, the main component force is the largest while the other two component forces are small, and thus the main component force may be regarded as the cutting force. Accordingly, in the present embodiment, the main component force is referred to as the cutting force in the following description.

FIG. 3 illustrates a state in which among five edges 6a, 6b, 6c, 6d, and 6e of the tool 6, the three edges 6a, 6b, and 6c are cutting the workpiece 15. In this case, a cutting force acts on each of the edges 6a, 6b, and 6c in a tangential direction respectively indicated by arrows 93a, 93b, and 93c. Since the tool 6 is fed in the direction of the arrow 92, the cutting force (arrow 93b) of the edge 6b, which is close to a tool path TP through which a center TC of the tool 6 passes and which has a large cutting amount in a radial direction, is the largest. The cutting force (arrow 93a) of the edge 6a slightly away from the tool path TP is the second largest, and the cutting force (arrow 93c) of the edge 6c, which is spaced away from the tool path TP by a distance equal to the tool radius, is the smallest. Consequently, cutting force (arrow 95) acting in a radial direction from the tool center TC becomes a resultant force of the respective cutting forces (arrows 93a, 93b, and 93c) of the three edges 6a, 6b, and 6c which actually contribute to the cutting action. Although, in FIG. 3, the three edges contribute to the cutting action, there is also a case in which only two edges contribute to the cutting action at a certain moment. The cutting force at that moment indicated by the arrow 95 is a resultant force of the cutting forces of those two edges.

The cutting force indicated by the arrow 95 is a resultant force of an X direction component (arrow 95x) and a Y direction component (arrow 95y). The X component (the arrow 95x) of the cutting force indicated by the arrow 95 is a sum of an X component (arrow 93ax) of the cutting force by the arrow 93a, an X component (arrow 93bx) of the cutting force by the arrow 93b, and an X component (zero in FIG. 3) of the cutting force by the arrow 93c. The Y component (arrow 95y) of the cutting force indicated by the arrow 95 is a sum of a Y component (arrow 93ay) of the cutting force by the arrow 93a, a Y component (arrow 93by) of the cutting force by the arrow 93b, and a Y component (arrow 93c in FIG. 3) of the cutting force by the arrow 93c. In the present embodiment, the actual cutting force received from the workpiece 15 at a preset position of the tool 6 is the cutting force indicated by the arrow 95, which acts in a radial direction from the center TP of the distal end of the tool 6. The preset position of the tool 6 is not limited to the center TP of the distal end of the tool 6, but may be set at any position. For example, in case of a ball end mill, a center of a spherical portion in the distal end of the tool can be the preset position. Further, when a margin of the workpiece is machined only by the side surface of an end mill, a midpoint of a section in the axial direction where the tool and the workpiece are in contact with each other can be determined as the preset position.

Next, the determination value of cutting force for determining an actual cutting force will be described. Referring to FIG. 2, the tool 6 is sometimes damaged when an excessive cutting force is applied to the tool 6. For example, when the cutting force is increased, a case may occur in which the tool 6 is broken or the edge of the tool 6 is chipped. Therefore, in the present embodiment, the allowable cutting force for the tool, which relates to the damage of the tool, is taken into consideration.

Further, the damage of the bearing that supports the spindle 4 may be exemplified as a failure of the spindle device 2 due to an excessive cutting force. For example, when the cutting force is increased, a case may occur in which a front bearing 7 or a rear bearing 8 is mechanically or thermally damaged. Therefore, in the present embodiment, allowable cutting forces of the bearings with respect to the damage of the bearings are taken into consideration.

Further, as a failure of the spindle device 2, a damage of the spindle motor 9 may be exemplified. For example, when the cutting force is increased, an instance occurs in which excessive current flows through the spindle motor 9 and causes a seizure of the spindle motor 9. Therefore, in the present embodiment, an allowable cutting force for the spindle motor, which relates to the damage of the spindle motor, is taken into consideration.

In general, the allowable cutting force for the bearing becomes greater than the allowable cutting force for the tool. The allowable cutting force for the spindle motor becomes greater than the allowable cutting force for the bearing. However, there is a case in which the order of magnitude of these allowable cutting forces is reversed. For example, when the tool diameter of the tool 6 is very large, there is a case in which the allowable cutting force for the tool becomes greater than the allowable cutting force for the bearing.

Alternatively, when the mechanical strength of the bearing is very high, there is a case in which the allowable cutting force for the bearing becomes greater than the allowable cutting force for the spindle motor.

The control apparatus 70 of the present embodiment calculates the allowable cutting force for the tool, the allowable cutting force for the bearing, and the allowable cutting force for the spindle motor, and compares them with each other. Further, the control apparatus 70 sets the smallest allowable cutting force as the determination value of the cutting force. In other words, the control apparatus 70 compares the three allowable cutting forces and sets the smallest cutting force as the determination value of the actual cutting force. The control apparatus 70 compares the actual cutting force with the determination value.

Referring to FIG. 1, the arithmetic processing part 25 includes a cutting force calculation part 39. The cutting force calculation part 39 acquires the type of the tool and the tool diameter described in the machining program 76. Alternatively, the cutting force calculation part 39 acquires the type of the tool and the tool diameter stored in the storage part 26. The cutting force calculation part 39 acquires a parameter relating to the load of the spindle motor 9 from the servo control part 74 or the operation state sensor 37. In the present embodiment, the current command value for driving the spindle motor 9 is acquired as the parameter relating to the load.

In addition to the current command value, a torque command value of the spindle motor 9, an actual current value flowing through the spindle motor 9, or the like may be used as the parameter relating to the load acquired by the cutting force calculation part 39. The cutting force calculation part 39 acquires the rotational speed of the spindle motor 9, i.e., the rotational speed of the spindle 4 from the operation state sensor 37. The cutting force calculation part 39 calculates the actual cutting force applied to the tool. The display control part 22 displays the calculated actual cutting forces on the display part 28.

The arithmetic processing part 25 includes a cutting force control part 38. The cutting force control part 38 acquires the type of tool, the tool length, and the tool diameter of the tool. Information for calculating the allowable cutting force is stored in the storage part 26. The cutting force control part 38 calculates the allowable cutting force and sets the determination value of the cutting force. The display control part 22 displays the set determination value of the cutting force on the display part 28. The cutting force control part 38 of the present embodiment calculates the allowable cutting force for the bearing and the allowable cutting force for the tool. The allowable cutting force for the spindle motor is stored beforehand in the storage part 26. The cutting force control part 38 compares the three allowable cutting forces and sets the determination value based on the smallest allowable cutting force.

Further, the cutting force control part 38 compares the actual cutting force with the determination value of the cutting force. When the actual cutting force exceeds the determination value, the cutting force control part 38 decreases the feed speed of the spindle. In other words, the cutting force control part 38 decreases a relative speed of the tool 6 with respect to the workpiece 15. In the decrease of the relative speed, a case is included where the relative speed of the tool 6 with respect to the workpiece 15 is made zero. The cutting force control part 38 decreases the override value of the feed speed and sends it to the reading and interpretation part 72. The display control part 22 displays on the display part 28 a warning that the feed speed is decreased while the relative movement is continued. Alternatively, the cutting force control part 38 sends to the reading and interpretation part 72 a command that sets the relative speed of the tool 6 with respect to the workpiece 15 to zero. The display control part 22 displays on the display part 28 the warning that the feed speed was made zero.

Figure 4:
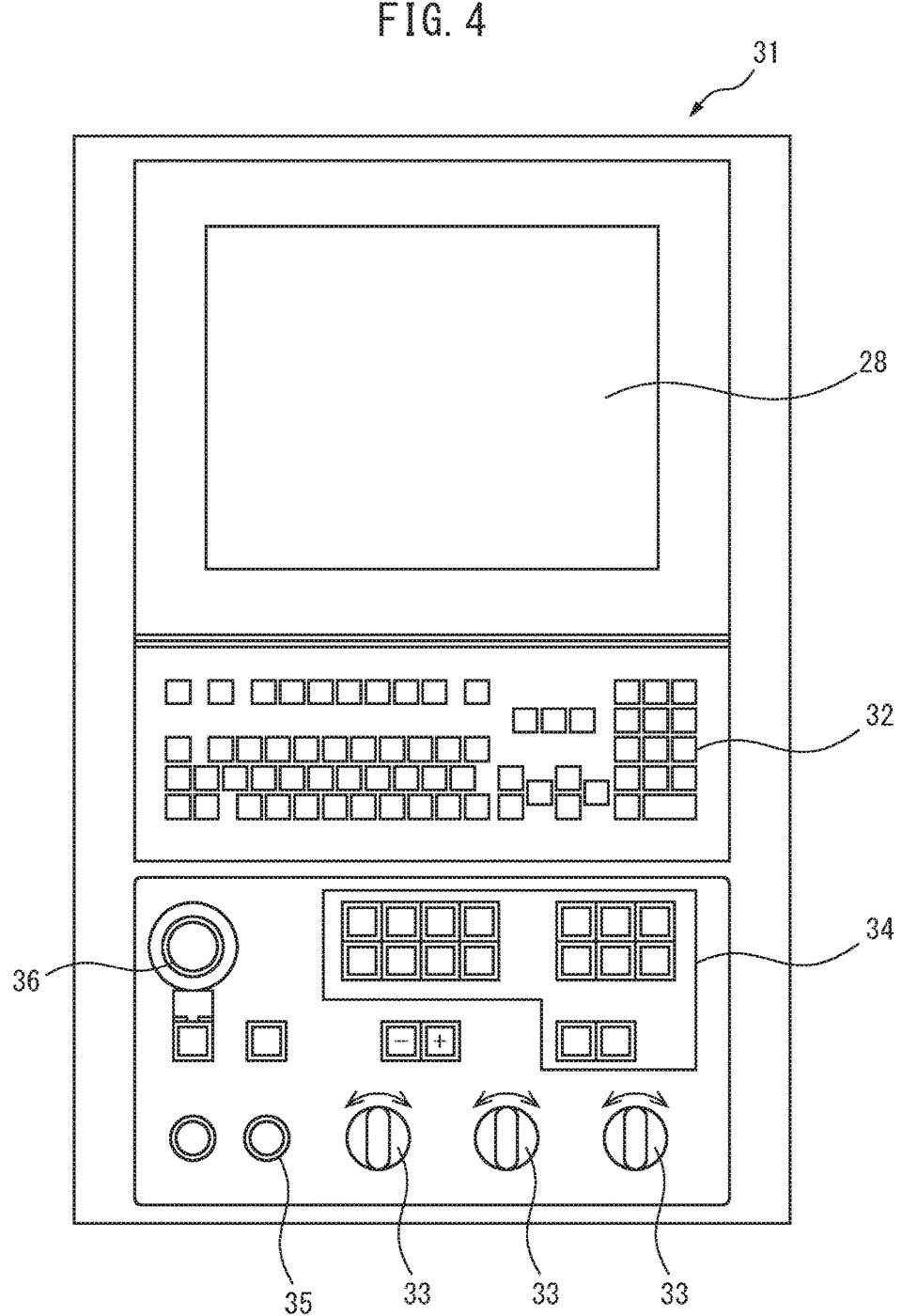
FIG. 4 is a schematic front view of a control panel of the machine tool.

FIG. 4 illustrates a front view of an operation panel provided in a control apparatus for a machine tool. Referring to FIGS. 1 and 4, the operation part 30 of the control apparatus 70 includes an operation panel 31. The operation panel 31 includes a key input part 32. The key input part 32 is provided with a plurality of key switches. By pressing a key switch of the key input part 32, a predetermined number or letter can be input. The operation panel 31 also includes an operation switch part 34 that carries out selection of a predetermined operation and override setting parts 33 that carry out setting of an override value. The override setting part 33 can, for example, manually set the override value for the rotational speed of the spindle, the override value for the feed speed of the machining process, and the like. The key input part 32, the operation switch part 34, and the override setting part 33 function as the manual input part 29. In addition, the operation panel 31 includes buttons such as an emergency stop button 36 for stopping the machine tool 1 immediately when the machine tool 1 is abnormal, and an execution button 35 for starting activation of the machine tool 1. The operation panel 31 also includes the display part 28 composed of a display panel.

Figure 5:
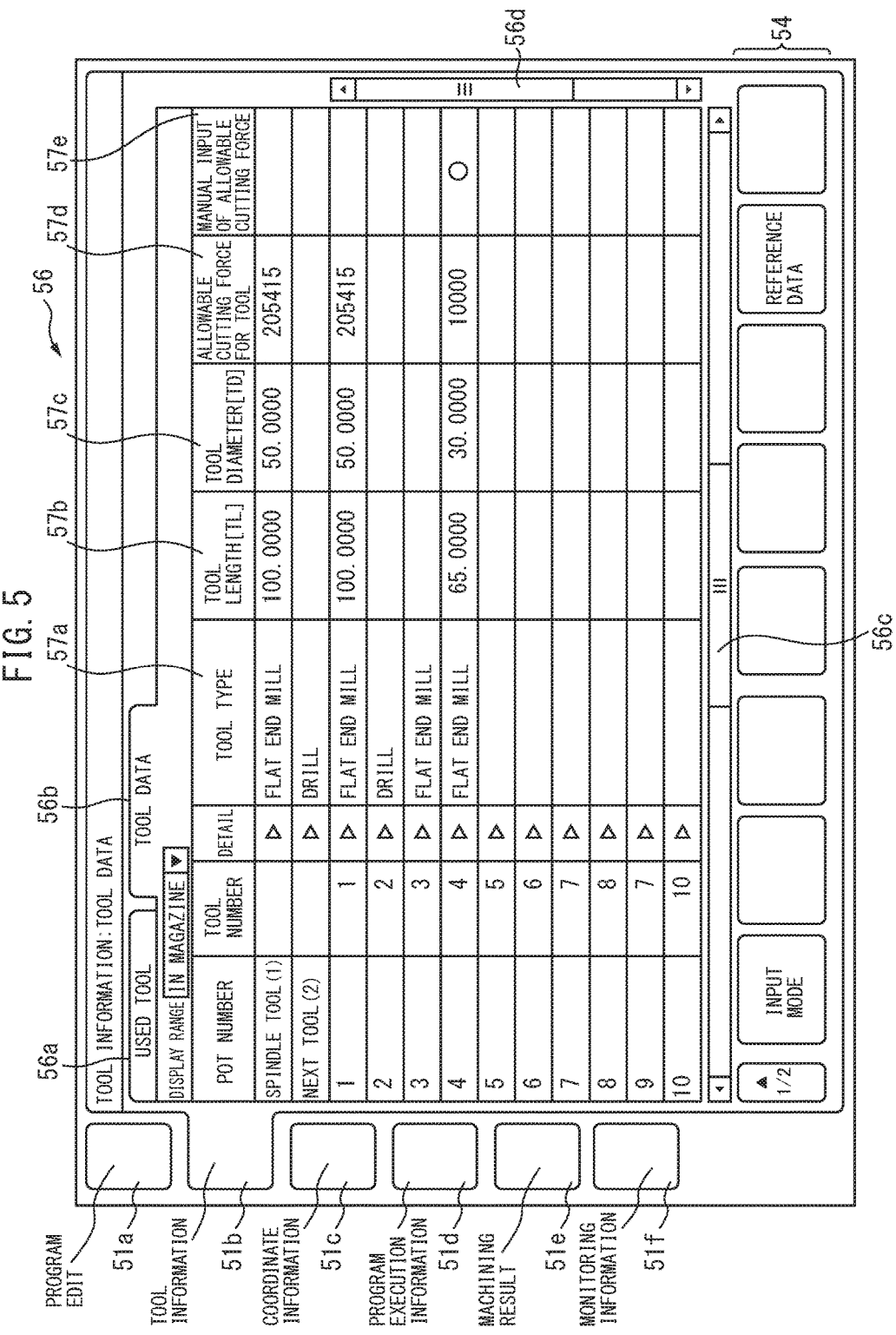
FIG. 5 is a tool information screen according to an embodiment.

FIG. 5 illustrates a tool information screen displayed on the display part 28 of the operation panel 31. The tool information screen 56 is a screen for inputting, displaying and editing information relating to the tool. On the left-hand side of the screen, selection parts 51a to 51f for switching information to be displayed are arranged. In the example of FIG. 5, the tool information screen 56 is displayed in response to the operator pressing selection part 51b for the tool information.

By pressing the selection parts 51a to 51d, it is possible for the operator to display a main screen which is frequently used during actual machining. By pressing the selection part 51a for program edit, a program edit screen can be displayed. The program edit screen is a screen for displaying and editing the machining program. By pressing the selection part 51c for coordinate information, a coordinate information screen can be displayed. The coordinate information screen is a screen for inputting, displaying, and editing the coordinate information. By pressing the selection part 51d for program execution information, an execution information screen can be displayed. The execution information screen is a screen for displaying a state of the machine tool and a machining state during execution of the machining program. By pressing the selection part 51e for machining result, a machining result screen can be displayed. The machining result screen is a screen for performing a test of the workpiece after machining and displaying a result of the test of the workpiece. By pressing the selection part 51f for monitoring information, a monitoring information screen can be displayed. The monitoring information screen is a screen for monitoring a state of machining such as a cutting force during machining of the workpiece.

In the lower part of the each main screen, a button area 54 is provided. In the button area 54, there are provided buttons for performing predetermined operations.

The tool information screen 56 includes a selection part 56a for selecting a screen that displays a tool to be used for machining, and a selection part 56b for selecting a screen that displays and is used for editing information of all tools stored in the storage part 26. The selection part 56b for tool data is selected herein. The information of each tool is represented in a table form. Tool numbers are numbers for specifying respective tools. In the pot number column, numbers for tool pots of a tool magazine are indicated.

The tool information screen 56 is formed so that a plurality of pieces of information for the respective tools can be displayed. By moving a scroll bar 56d, information of a tool not displayed in the screen can be displayed. Further, by moving the scroll bar 56c, a variety of information about the respective tools can be displayed. In a display column 57a, the type of a tool is represented. In a display column 57b, the tool length of each tool is represented. In a display column 57c, the tool diameter of each tool is represented. In a display column 57d, the allowable cutting force for the tool calculated based on the type of the tool, the tool length, and the tool diameter is represented. In each of the display columns 57a, 57b, 57c, and 57d, it is possible for the operator to input and edit desired information. Further, the arithmetic processing part 25 can read the type of the tool, the tool length, and the tool diameter from the machining program.

Next, description will be made of a method for calculating the allowable cutting force for setting the determination value of the cutting force. The allowable cutting force can be calculated based on the type of the tool, the tool length, and the tool diameter. Referring to FIG. 2, the tool diameter TD is the diameter of the tool 6, and the tool length TL is the length from the front side end surface of the spindle 4 to the distal end of the tool 6. In other words, the tool length TL is the length of the tool 6 that protrudes from the spindle 4.

Description will first be made of a method for calculating the allowable cutting force for the bearing. Referring to FIG. 2, the spindle 4 is supported by the front bearing 7 and the rear bearing 8. The cutting force control part 38 calculates a load that can be applied onto the distal end of the tool 6 as indicated by an arrow 95, i.e., an allowable cutting force in a radial direction based on the withstand load of each bearing.

A distance $L_1$ is the length between the front side end face of the spindle 4 and the position of the front bearing 7 in the axial direction of the spindle 4. When a plurality of the front bearings 7 are arranged in the axial direction, in the region where the plurality of the front bearings 7 are arranged, the position of a midpoint in the axial direction is selected as the position of the front bearing 7. A distance $L_2$ is the length between the front bearing 7 and the rear bearing 8 in the axial direction of the spindle 4. When a plurality of the rear bearings 8 are arranged in the axial direction, in the region where the plurality of the rear bearings 8 are arranged, the position of a midpoint in the axial direction is selected as the position of the rear bearing 8. The allowable cutting force is calculated using the distances $L_1$ and $L_2$.

A case is considered in which the front bearing 7 is damaged. When a large cutting force is applied at the distal end of the tool 6, it is conceivable that a load is applied to the front bearing with the position of the rear bearing 8 as a fulcrum, whereby the front bearing 7 is damaged. The withstand load $F_F$ of the front bearing 7 is predetermined. The allowable cutting force $F_{F-Limit}$ associated with the front bearing 7 can be represented by the following equation (1) using the withstand load $F_F$ of the front bearing 7.

[Formula 1]

$$F_{F-Limit} = \frac{L_2}{TL + L_1 + L_2} \times F_F \qquad (1)$$

$F_{F-Limit}$: allowable cutting force associated with the front bearing
TL: tool length (mm)
$L_1$: distance (mm) between the distal end of the spindle and the front bearing
$L_2$: distance (mm) between the bearings
$F_F$: withstand load [N] of the front bearing Next, a case is considered in which the rear bearing 8 is damaged. When a large cutting force is applied at the distal end of the tool 6, it is conceivable that a load is applied to the rear bearing 8 with the position of the front bearing 7 as a fulcrum, whereby the rear bearing 8 is damaged. The withstand load $F_R$ of the rear bearing 8 is predetermined. The allowable cutting force $F_{R-Limit}$ associated with the rear bearing 8 can be represented by the following equation (2) using the withstand load $F_R$ of the rear bearing 8.

[Formula 2]

$$F_{R-Limit} = \frac{L_2}{TL+L_1} \times F_R \tag{2}$$

$F_{R-Limit}$: allowable cutting force [N] associated with the rear bearing
$F_R$: withstand load [N] of the rear bearing When a large cutting force is applied to the tool 6, the bearing whose allowable cutting force is smaller according to the above equation (1) or (2) is damaged earlier. Accordingly, a smaller one of the values of the allowable cutting force $F_{F-Limit}$ and the allowable cutting force $F_{R-Limit}$ is selected as the allowable cutting force for the bearing.

In this manner, the allowable cutting force for the bearing can be calculated based on the tool length TL. The allowable cutting force for the bearing is not limited to the force calculated by the above calculation method, but the allowable cutting force which makes it possible to avoid a possibility that the bearing is damaged, can be calculated by any method.

Regarding the allowable cutting force for the tool, which relates to a damage of the tool, a case is considered in which the tool is damaged when a cutting force in a radial direction is applied at the distal end of the tool 6 as indicated by the arrow 95. The allowable cutting force for the tool depends on the tool diameter and the tool length. The larger the tool diameter TD of the tool 6, the less likely it becomes that the tool is damaged, and also the lager the allowable cutting force for the tool becomes. Further, the larger the tool length TL of the tool 6, the more likely it becomes that the tool is damaged, and the smaller the allowable cutting force for the tool becomes. In the present embodiment, it is assumed that the tool is a cylindrical rod, and the allowable cutting force for the tool is calculated based on the shear limit of the cylindrical rod.

Figure 6:
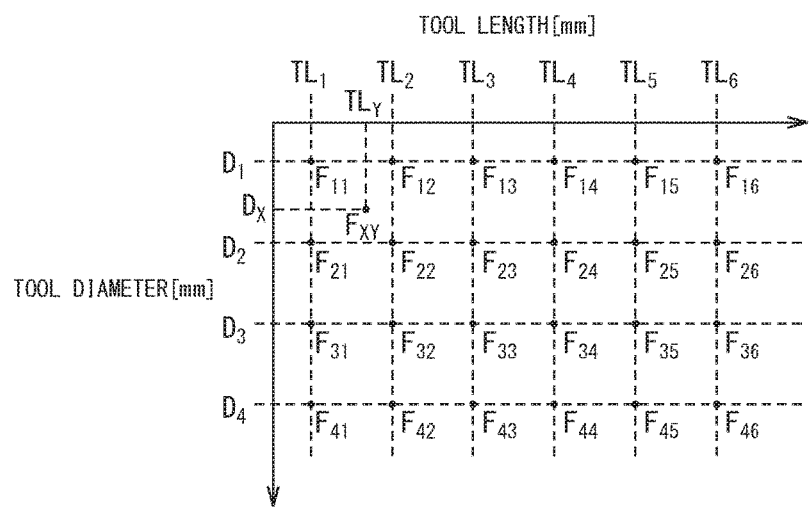
FIG. 6 is an explanatory diagram of a data table for calculating an allowable cutting force for the tool.

FIG. 6 shows an explanatory diagram of a data table of the allowable cutting force for the tool based on the tool length and the tool diameter. In the present embodiment, the allowable cutting force for the tool is calculated according to a data table with a function of the tool length and the tool diameter. Such a data table is stored beforehand in the storage part 26 for each type of tool. The data table of the allowable cutting force for the tool may be stored beforehand in the storage part 26 for each material of the tool in addition to that for each type of the tool.

The cutting force control part 38 calculates the allowable cutting force for a tool based on the tool length and the tool diameter of the tool 6 to be used. In the example illustrated in FIG. 6, the tool length $TL_1$ to the tool length $TL_6$ are set for the tool length TL. The tool diameter $D_1$ to the tool diameter $D_4$ are set for the tool diameter TD. The allowable cutting force $F_{mn}$ of the tool is set for each tool length and tool diameter. For example, a tool with the tool length $TL_1$ and the tool diameter $D_1$ has a allowable cutting force $F_{11}$. According to this data table, an allowable cutting force $F_{XY}$ of a tool having a tool diameter $D_X$ and a tool length $TL_Y$ to be used is calculated by interpolation.

Figure 7:
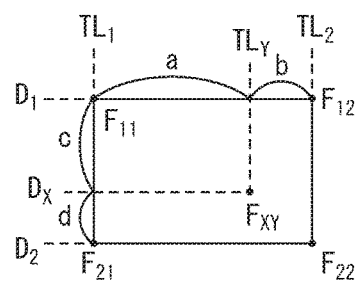
FIG. 7 is a diagram for explaining interpolation in a data table.

FIG. 7 shows a diagram for explaining interpolation when the allowable cutting force for the tool is calculated. In this example, the allowable cutting force $F_{XY}$ is calculated using allowable cutting forces $F_{11}$, $F_{12}$, $F_{21}$, and $F_{22}$ for each of the tool lengths $TL_1$, $TL_2$ and the tool diameters $D_1$, $D_2$. The internal division ratios a, b, c, and d are represented by equations (3) to (6), respectively.

[Formula 3]

$$a = \frac{|TL_Y - TL_1|}{|TL_2 - TL_1|} \tag{3}$$

$$b = 1 - a \tag{4}$$

$$c = \frac{|D_X - D_1|}{|D_2 - D_1|} \tag{5}$$

$$d = 1 - c \tag{6}$$

$D_m$: tool diameter [mm]
$TL_n$: tool length [mm]
a, b, c, d: internal division ratio The allowable cutting force $F_{XY}$ for the tool length $TL_Y$ and the tool diameter $D_X$ is calculated based on the rule for internal division, and represented as the following equation (7).

[Formula 4]

$$F_{XY}=F_{11} \times b \times d+F_{12} \times a \times d+F_{21} \times b \times c+F_{22} \times a \times c \tag{7}$$

$F_{XY}$, $F_{11}$, $F_{12}$, $F_{21}$, $F_{22}$: allowable cutting force

In this manner, in the present embodiment, the allowable cutting forces of the plurality of tools as a function of the tool length and the tool diameter are predetermined as a data table. The allowable cutting force for the tool is calculated based on the tool length and the tool diameter of a tool to be used. By adopting this method, it is possible to easily calculate the allowable cutting force for the tool.

Referring to FIGS. 1 and 5, in the present embodiment, the allowable cutting force for the tool is automatically calculated by displaying the tool information screen 56. The cutting force control part 38 can read the tool length, the tool diameter, and the tool type from the machining program 76. Alternatively, they can previously be inputted into the information control part 20 and stored in the storage part 26 by the operator operating the operation part 30. In this case, the cutting force control part 38 acquires the tool length, the tool diameter, and the tool type from the storage part 26. Subsequently, the cutting force control part 38 calculates the allowable cutting force for the tool. The display control part 22 displays the calculated allowable cutting force for the tool in the display column 57d.

When the operator manually inputs the allowable cutting force for the tool in the display column 57d, a mark indicating the input by the operator is displayed in the display column 57e. For example, with a flat end mill whose tool number is 4, the allowable cutting force for the tool is inputted by the operator, and a mark is displayed in the display column 57e.

Figure 8:
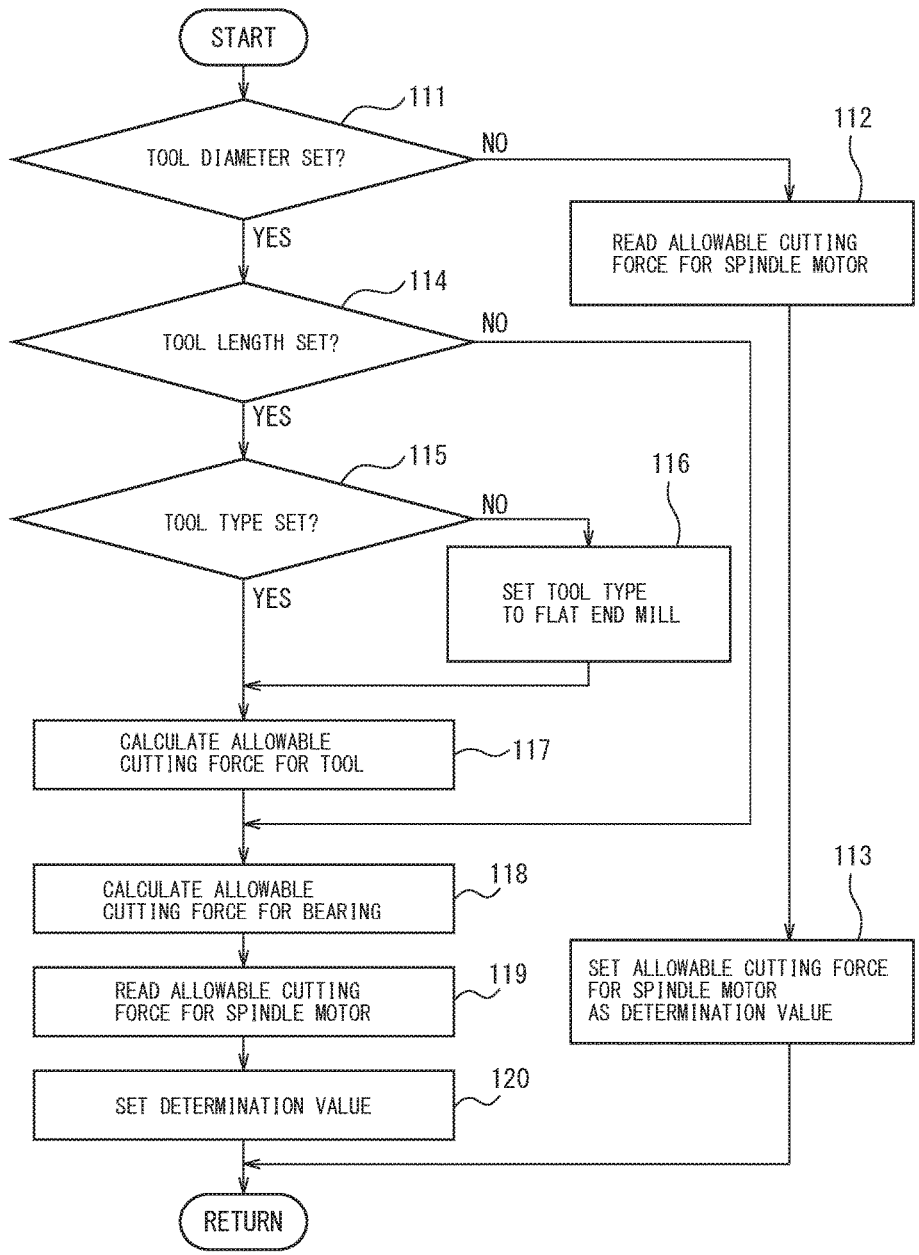
FIG. 8 is first control flow chart of the machine tool in the embodiment.

FIG. 8 shows a flow chart of control for setting a determination value in order to determine the actual cutting force applied to the tool. This control can be performed each time the tool is changed. Alternatively, the control can be performed each time the rotational speed of the spindle changes. In the present embodiment, this control is performed in the cutting force control part 38 of the arithmetic processing part 25.

In step 111, it is determined whether or not the tool diameter is set. When the tool diameter is not set, the process proceeds to step 112. It is not possible to calculate the allowable cutting force for the tool when the tool diameter is not set. Further, it is not possible to calculate a determination value for a load factor of the spindle motor by equation (9) which will be described hereinafter. Therefore, the allowable cutting force for the spindle motor is set as the allowable cutting force. In step 112, the allowable cutting force for the spindle motor is read from the storage part 26. In step 113, the allowable cutting force for the spindle motor is set as the determination value.

In step 111, when the tool diameter is set, the process proceeds to step 114. In step 114, it is determined whether or not the tool length is set. When the tool length is not set in step 114, the process proceeds to step 118. In this case, the allowable cutting force for the tool is not calculated, but the allowable cutting force for the bearing is calculated. For example, it is possible to calculate the allowable cutting force for the bearing with the tool length being zero. Hence, the process proceeds to step 118 without performing calculation of the allowable cutting force for the tool from step 115 to step 117.

When the tool length is set in step 144, the process proceeds to step 115. In step 115, it is determined whether or not the tool type is set. When the tool type is not set in step 115, the process proceeds to step 116. In the present embodiment, when the tool type is not set, the tool type is set to a flat end mill. In other words, the allowable cutting force is calculated under the assumption that the tool is a flat end mill.

When the tool type is set in step 115, the process proceeds to step 117. In step 117, the allowable cutting force for the tool is calculated using the above equations (3) to (7). In step 118, the allowable cutting force for the bearing is calculated using the above equations (1) and (2). In step 119, the allowable cutting force for the spindle motor is read in from the storage part 26.

In step 120, the determination value for performing determination of the actual cutting force is set based on the allowable cutting force. The unit of each allowable cutting force is the unit of force. The smallest allowable cutting force among the allowable cutting force for the tool, the allowable cutting force for the bearing, and the allowable cutting force for the spindle motor is set as the determination value of the cutting force.

In the present embodiment, the allowable cutting force for the tool, which relates to damage of the tool, the allowable cutting force for the bearing, which relates to damage of the bearing in the spindle device, and the allowable cutting force for the spindle motor, which relates to damage of the spindle motor, are calculated. The determination value is set based on the smallest allowable cutting force of these allowable cutting forces. By performing this control, it is possible to set the determination value of the cutting force to a safe side and monitor the tool and the spindle device. In the present embodiment, the smallest allowable cutting force is set as the determination value, but the embodiment is not limited to this. The determination value can be set based on the allowable cutting force. For example, the determination value may be set by subtracting a predetermined margin from the selected allowable cutting force.

Subsequently, description will be made of control for performing monitoring of the actual cutting force during a machining period based on the set determination value. Referring to FIG. 1, the calculation of the actual cutting force can be performed in the cutting force calculation part 39. Further, determination of the actual cutting force can be performed in the cutting force control part 38.

Figure 9:
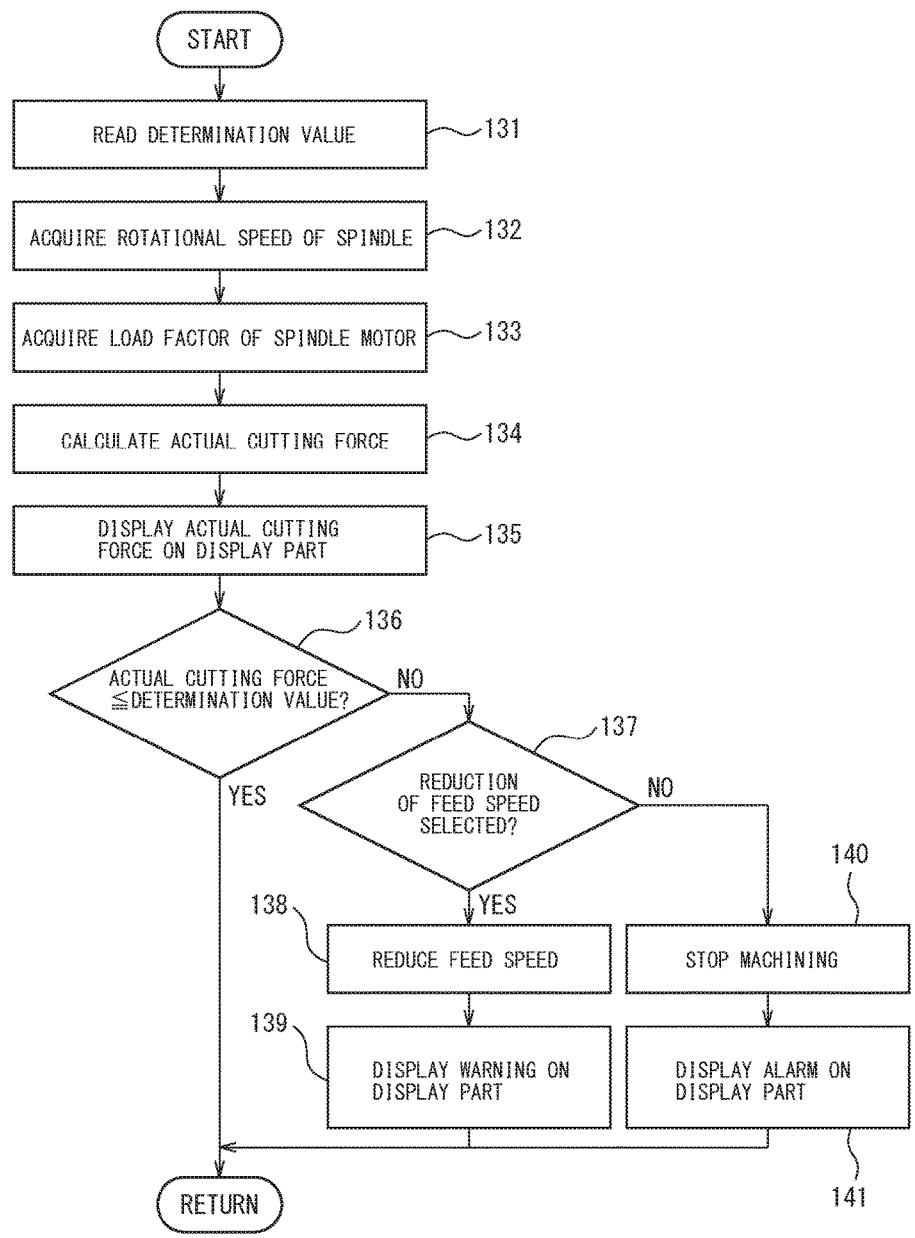
FIG. 9 is second control flow chart of the machine tool in the embodiment.

FIG. 9 shows a flow chart of control performed during machining of a workpiece. The control illustrated in FIG. 9 may be performed, for example, at each predetermined time interval. In step 131, the set determination value of the cutting force is read.

Next, the actual cutting force applied to the tool is calculated. In step 132, the rotational speed of the spindle 4 is acquired from the operation state sensor 37. In step 133, the load factor of the spindle motor is acquired from the operation state sensor 37. The load factor of the spindle motor is the ratio of an output of the spindle motor during machining to a maximum output of the spindle motor. In the present embodiment, a current value is detected as the output of the spindle motor. In other words, the ratio of the current value during machining to the rated current of the spindle motor is calculated as the load factor of the spindle motor.

Next, in step 134, the actual cutting force is calculated. The cutting force calculation part 39 calculates the actual cutting force based on the following equation (8).

[Formula 5]

$$F = \frac{60 \times 1000 \times P_{MAX}}{2\pi N \times L_{MAX} \times r} \times CL \div 100 \tag{8}$$

F: actual cutting force [N]
$P_{MAX}$: spindle maximum output [kW]
N: rotational speed [min$^{-1}$] of the spindle
$L_{MAX}$: load factor [%] at maximum output of the spindle motor
r: tool radius [mm]
CL: load factor [%] of the spindle motor The actual cutting force F depends on the rotational speed of the spindle and the tool radius. In the present embodiment, the actual cutting force can be calculated even if the rotational speed of the spindle changes or the tool is changed. Subsequently, in step 135, the actual cutting force and the determination value are displayed on the display part 28.

Figure 10:
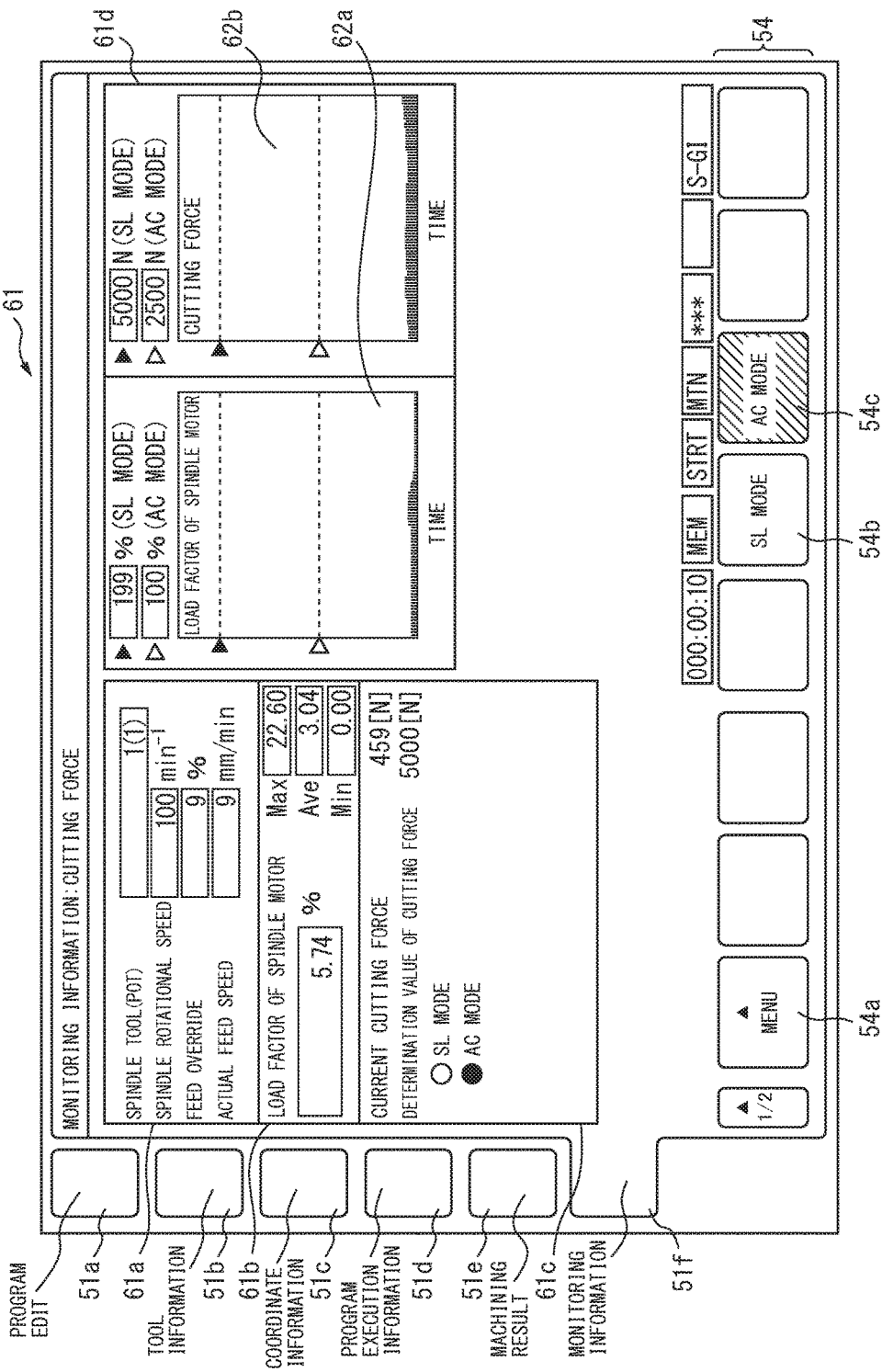
FIG. 10 is a diagram of a monitoring information screen in an embodiment.

FIG. 10 shows the monitoring information screen during machining of the workpiece. A selection part 51*f* is pressed and the monitoring information screen is displayed. Further, a cutting force is selected from a selection menu displayed by pressing a button 54*a* in a button region 54. The monitoring information screen 61 related to the cutting force includes display regions 61*a*, 61*b*, 61*c*, and 61*d*.

In the display region 61*a*, information of the spindle device during machining of a workpiece and information relating to movement of a tool with respect to the workpiece are displayed. In the display region 61*b*, the load factor of the spindle motor is displayed. In addition, the up-to-date maximum, minimum, and average values of the load factor of the spindle motor are displayed. In the display region 61*c*, the current cutting force (actual cutting force) and the determination value of the cutting force are displayed. In addition, the operation mode when the actual cutting force exceeds the determination value is displayed in the display region 61*c*.

When the actual cutting force exceeds the determination value, the control apparatus 70 of the present embodiment can perform control for reducing the feed speed while continuing the relative movement. Alternatively, the control apparatus 70 can perform control for reducing the feed speed to zero when the actual cutting force exceeds the determination value. By pressing the button 54b, it is possible to select control for making the feed speed zero, i.e., SL operation mode for stopping machining. By pressing the button 54c, it is possible to select AC operation mode for reducing the feed speed while continuing the relative movement of the tool with respect to the workpiece. In the example illustrated in FIG. 10, the AC operation mode is selected. In the display region 61c, it is displayed that the AC operation mode is selected.

In the display area 61d, a graph 62a of the load factor of the spindle motor and a graph 62b of the cutting force are displayed. The horizontal axis of each graph is time. The unit of the vertical axis in the load factor graph of the spindle motor is "%". The unit of the vertical axis in the cutting force graph is "N". In the respective graphs, a determination value of the SL operation mode and a determination value of the AC operation mode are displayed. In the present embodiment, the selected allowable cutting force is set as the determination value of the SL operation mode. The determination value of the AC operation mode can be calculated by multiplying the determination value of the SL operation mode by a predetermined ratio. The determination value of each operation mode is not limited to this embodiment, but can be set arbitrarily based on the allowable cutting force.

In each of the graphs 62a and 62b, lines of the determination values are displayed. The load factor and the cutting force for the spindle motor detected during the actual machining period are illustrated in a bar graph. In this manner, in the present embodiment, it is possible to calculate the cutting force received by the tool from the workpiece during machining of the workpiece, and display the calculated cutting force on the display part. As such, the operator can confirm the actual cutting force that changes over time. The operator can grasp the actual cutting force applied to the tool and can easily and accurately monitor the soundness of the tool and the spindle device.

Referring to FIG. 9, next, in step 136, the cutting force control part 38 compares the actual cutting force with the determination value. In the present embodiment, the determination value of the cutting force is converted to a variable corresponding to the load factor of the spindle motor in order to compare the actual cutting force with the determination value of the cutting force. The converted determination value is compared with the load factor of the spindle motor. The following equation (9) is used in order to convert the determination value of the cutting force to the determination value corresponding to the load factor of the spindle motor.

[Formula 6]

$$SL_{lim} = \frac{2\pi N \times L_{max} \times r}{60 \times 1000 \times P_{max} \times \delta} \times F_{lim} \times 100 \quad (9)$$

$SL_{lim}$: determination value [%] of the load factor of the spindle motor
N: rotational speed [min$^{-1}$] of the spindle
$L_{max}$: load factor [%] at maximum output of the spindle motor
r: tool radius [mm]
$P_{max}$: spindle maximum output [kW]

δ: cutting force conversion factor
$F_{lim}$: determination value [N] of the cutting force The spindle maximum output $P_{max}$ is the maximum output of the spindle motor dependent on the rotational speed of the spindle. The spindle maximum output $P_{max}$ is stored beforehand in the storage part. The determination value $SL_{lim}$ of the load factor of the spindle motor thus calculated is compared with the actual load factor of the spindle motor. When the load factor of the spindle motor exceeds the determination value $SL_{lim}$ of the load factor of the spindle motor, it can be determined that the actual cutting force exceeds the determination value of the cutting force. The cutting force conversion factor δ can be determined in advance by experiment.

In the present embodiment, the cutting force comparison is performed by converting the determination value of the cutting force to a value of the same unit as the load factor of the spindle motor, but the embodiment is not limited to this. The determination value and the actual cutting force may be compared in the unit of the cutting force. Also, when the determination value is set in step 120 of FIG. 8, a plurality of allowable cutting forces may be converted into values of the same unit as the load factor of the spindle motor, and the plurality of allowable cutting forces may be compared. In this case, for the allowable cutting force for the spindle motor, the value converted into a value of the same unit as the load factor of the spindle motor may be stored in the storage part.

In step 136, when the actual cutting force is equal to or smaller than the determination value of the cutting force, it can be determined that no excessive force is applied to the tool and the spindle device. It can be determined that the soundness of the tool and the spindle device is maintained. In this case, this control can be terminated.

When the actual cutting force is larger than the determination value of the cutting force in step 136, the process proceeds to step 137. In step 137, it is determined whether or not the control for reducing the feed speed is selected while continuing the relative movement of the tool with respect to the workpiece. In other words, it is determined whether or not the aforementioned AC operation mode is selected. When the control for reducing the feed speed is selected in step 137, the process proceeds to step 138.

In step 138, the feed speed is reduced while the relative movement of the tool with respect to the workpiece is continued. The cutting force control part 38 performs control for reducing the override value of the feed speed. The reduction width of the override value can be predetermined. Alternatively, a control can be performed such that the larger the difference between the actual cutting force and the determination value, the larger the reduction width of the override value.

Subsequently, in step 139, an image of a warning notifying that the actual cutting force has exceeded the determination value and the feed speed has been reduced is displayed on the display part 28. For example, an auxiliary screen smaller than the main screen is displayed in superposition on the main screen in the display part 28, and an image of the warning is displayed on the auxiliary screen.

When the control for reducing the feed speed is not selected in step 137, the process proceeds to step 140. In this case, the control for making the relative speed of the tool with respect to the workpiece zero is selected. In other words, the aforementioned SL operation mode is selected. In step 140, the machining of the workpiece is stopped. The cutting force control part 38 sends a command for setting the feed speed to zero to the reading and interpretation part 72. The feed speed of the tool with respect to the workpiece is made zero.

Next, in step 141, the image of the alarm notifying that the actual cutting force has exceeded the determination value and the machining has been stopped is displayed on the display part 28. For example, an auxiliary screen smaller than the main screen is displayed in superposition on the main screen in the display part 28, and the image of the alarm is displayed on the auxiliary screen.

By viewing the image of the warning or the image of the alarm, the operator can grasp that the actual cutting force has exceeded the predetermined determination value, so that the feed speed has reduced or the machining has stopped. When the actual cutting force exceeds the determination value, it is possible to suppress damage of the spindle device and the tool by using a method for reducing the relative speed of the tool with respect to the workpiece. When the actual cutting force does not exceed the determination value for a longer period than a predetermined time in a case where the control for reducing the feed speed was performed, the control for increasing the feed speed may be performed. For example, a control which returns the feed speed to the original speed prior to the reduction thereof may be performed.

In this manner, since the actual cutting force at every moment is calculated and displayed based on the torque command value, the current command value, or the actual current value of the spindle motor, it becomes easy for the operator to understand the relationship between the allowable cutting force written in the unit of "kgf" or "N" (Newton) in the instruction manual of the machine tool and the tool being used. Further, when machining is performed with a tool, it becomes possible to easily and substantially accurately determine the magnitude of the cutting force that can be applied to the tool. Further, since the determination value can be set automatically, the burden on the operator is reduced.

In each of the above-described controls, the order of the steps may be appropriately changed within a range in which the functions and the actions are not changed. The above-described embodiments may be appropriately combined.

In each of the above drawings, identical or equivalent parts are assigned identical reference numerals. The above embodiments are exemplary and do not limit the invention in any way. Further, the above embodiments encompass changes in mode as set forth in the claims.

REFERENCE SIGNS LIST

1 machine tool
4 spindle
6 tool
7 front bearing
8 rear bearing
9 spindle motor
15 workpiece
25 arithmetic processing part
28 display part
30 operation part
37 operation state sensor
38 cutting force control part
39 cutting forth calculation part
31 operation panel
56 tool information screen
61 monitoring information screen
62b graph
70 control apparatus

The invention claimed is:

1. A control method for a machine tool for machining a workpiece while causing relative movement between a tool rotated by a spindle motor and the workpiece fixed to a table, comprising:
    calculating an actual cutting force received from the workpiece at a predetermined position of the tool during machining of the workpiece based on a torque command value, a current command value, or an actual current value of the spindle motor, wherein the actual cutting force acts in a radial direction of the tool;
    displaying the calculated actual cutting force on a display part;
    calculating a first allowable cutting force for the tool that is allowed to be applied to the tool at the predetermined position of the tool, wherein the first allowable cutting force relates to damage of the tool;
    calculating a second allowable cutting force for a bearing that is allowed to be applied to the bearing at the predetermined position of the tool, wherein the second allowable cutting force relates to damage of the bearing in a spindle device;
    determining a determination value based on the smallest allowable cutting force among the first allowable cutting force for the tool and the second allowable cutting force for the bearing; and
    reducing a relative speed of the tool with respect to the workpiece when the calculated actual cutting force exceeds the determination value.

2. The control method of claim 1, wherein the first allowable cutting force as a function of a length of the tool protruding from the spindle and a tool diameter is predetermined for a plurality of the tools, and calculating the first allowable cutting force comprises:
    calculating the first allowable cutting force for the tool based on a protrusion length and the tool diameter of the tool used for the machining of the workpiece.

3. The control method of claim 1, wherein determining the determination value comprises:
    calculating a third allowable cutting force for the spindle motor that is allowed to be applied to the spindle motor, wherein the third allowable cutting force relates to damage of the spindle motor; and
    setting the determination value based on the smallest allowable cutting force among the first allowable cutting force for the tool, the second allowable cutting force for the bearing, and the third allowable cutting force for the spindle motor.

4. A control apparatus for a machine tool for machining a workpiece while causing relative movement between a tool rotated by a spindle motor and the workpiece fixed to a table, comprising:
    a cutting force calculation part that calculates an actual cutting force received from the workpiece at a predetermined position of the tool during machining of the workpiece, based on a torque command value, a current command value, or an actual current value of the spindle motor, wherein the actual cutting force acts in a radial direction of the tool;
    a display part that displays the calculated actual cutting force; and
    a cutting force control part that:
        calculates a first allowable cutting force for the tool that is allowed to be applied to the tool at the predetermined position of the tool, wherein the first allowable cutting force relates to damage of the tool;

calculates a second allowable cutting force for a bearing that is allowed to be applied to the bearing at the predetermined position of the tool, wherein the second allowable cutting force relates to damage of the bearing in a spindle device;

determine a determination value based on the smallest allowable cutting force among the first allowable cutting force for the tool and the second allowable cutting force for the bearing; and reduces a relative speed of the tool with respect to the workpiece when the calculated actual cutting force exceeds the determination value.

\* \* \* \* \*